(12) United States Patent
Findling et al.

(10) Patent No.: US 11,399,662 B2
(45) Date of Patent: Aug. 2, 2022

(54) MANUAL ROTARY MILL FOR PLANT MATERIAL

(71) Applicants: Keith Findling, Salt Lake City, UT (US); Samuel Tresco, Salt Lake City, UT (US); Thomas Watson, Salt Lake City, UT (US)

(72) Inventors: Keith Findling, Salt Lake City, UT (US); Samuel Tresco, Salt Lake City, UT (US); Thomas Watson, Salt Lake City, UT (US)

(73) Assignee: Keith Findling, Salt Lake City, UT (US)

(*) Notice: Subject to any disclaimer, the term of this patent is extended or adjusted under 35 U.S.C. 154(b) by 110 days.

(21) Appl. No.: 16/845,697

(22) Filed: Apr. 10, 2020

(65) Prior Publication Data

US 2020/0323391 A1 Oct. 15, 2020

Related U.S. Application Data

(60) Provisional application No. 62/831,973, filed on Apr. 10, 2019.

(51) Int. Cl.
*A47J 42/20* (2006.01)
*A47J 42/14* (2006.01)
*A47J 42/18* (2006.01)

(52) U.S. Cl.
CPC .............. *A47J 42/20* (2013.01); *A47J 42/14* (2013.01); *A47J 42/18* (2013.01)

(58) Field of Classification Search
CPC .. A47J 42/20; A47J 42/18; A47J 42/14; A47J 42/32; A47J 42/12; A47J 42/38; A47J 42/00; A47J 43/25; A47J 43/255
See application file for complete search history.

(56) References Cited

U.S. PATENT DOCUMENTS

| | | | | |
|---|---|---|---|---|
| 1,359,410 A | * | 11/1920 | Polidoro | A47J 43/255 241/167 |
| 2,852,203 A | * | 9/1958 | Ditting | A47J 42/18 241/259 |
| 2008/0191073 A1 | * | 8/2008 | Bao | B02C 18/24 241/101.2 |
| 2012/0168544 A1 | * | 7/2012 | Chaoui | A47J 42/24 241/68 |
| 2013/0214068 A1 | * | 8/2013 | Camitta | B02C 18/24 241/25 |
| 2018/0199759 A1 | * | 7/2018 | Qiu | A47J 42/20 |
| 2018/0271327 A1 | * | 9/2018 | Haskins | A47J 42/14 |
| 2019/0150666 A1 | * | 5/2019 | Wozniak | A47J 42/34 |

* cited by examiner

*Primary Examiner* — Jessica Cahill
*Assistant Examiner* — Mohammed S. Alawadi
(74) *Attorney, Agent, or Firm* — Intellectual Strategies

(57) ABSTRACT

A manual mill that indicates through force feedback and free spin the completion of processing of the material inside through shearing, grating, and crumbling, without the use of teeth or protrusions, with easy grip-and-lift access to said processed material.

11 Claims, 9 Drawing Sheets ized. All changes
MANUAL ROTARY MILL FOR PLANT MATERIAL

CROSS-REFERENCE TO RELATED APPLICATIONS

This application claims the benefit of U.S. Provisional Application No. 62/831,973, filed on Apr. 10, 2019, which is incorporated by reference herein in its entirety.

SUMMARY

Embodiments described herein relate to a manual mills, graters, or grinders, for smokable or edible herbs, flowers, etc.

Embodiments described herein provide one or more of the following benefits: easier access to the materials processed by the grater, easier access to process plant material in a way that is more consistent, provides the user with a non-visual cue as to when the grinding is complete, reduce the strength and dexterity needed to process material, and enable easy cleaning through low part count and processing methods without protrusions.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
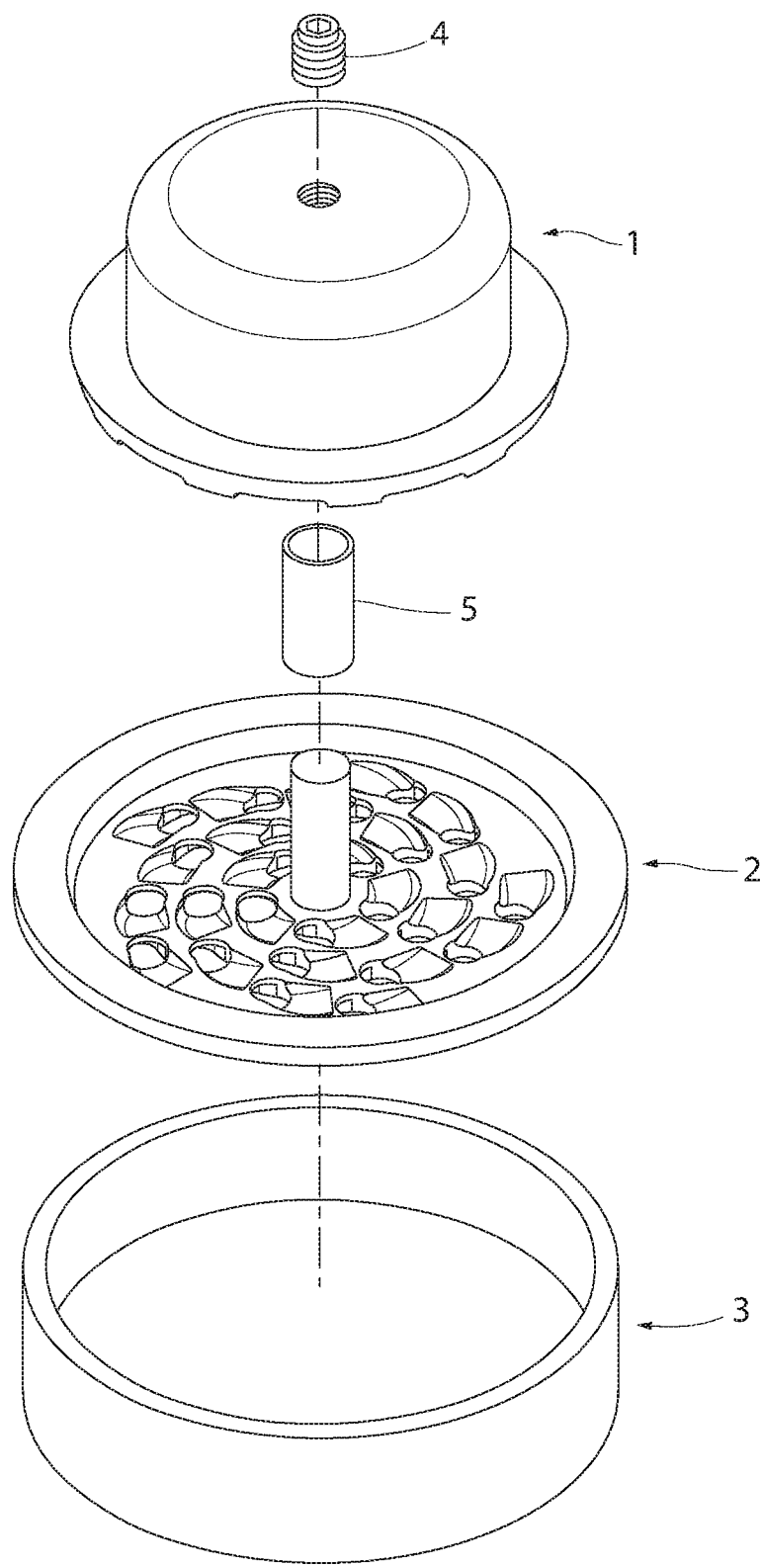
FIG. 1 depicts an exploded view of the assembly components for one embodiment of a manual mill.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

A manual mill used to separate plant material, such as tobacco, herbs, or other leaves, flowers, etc. into smaller pieces for use in cooking, smoking, or other activities where needed. An embodiment of the manual mill includes a driver that is shaped to allow the user to rotate it with their hand, with a driver plate on its bottom that acts to move the plant material in rotation past the stationary grater plate as well as apply down force to assist in the processing of material. Sitting under the driver and grater plate is a collection chamber. The driver interfaces with the grater plate through the grater plate center shaft which slides into the driver at its central point, making the two halves of the grater chamber coaxial. This shaft comes into contact with an adjustable screw set inside the driver handle, allowing for height adjustment so that the two plates never come into direct contact with one another, allowing the driver to have variable force feedback throughout the processing of material and to spin freely to indicate when the plant material has been fully processed. The grater plate has a lip sized to protrude slightly from the perimeter of the receptacle that it sits on, so the user can lift the grater plate, driver, and handle as a unit and access the processed material held by the material receptacle.

FIG. 1 shows in explode view an embodiment of the grater, including the driver 1, grater plate 2, and receptacle 3, with the screw 4 and driver bushing 5.

Figure 2:
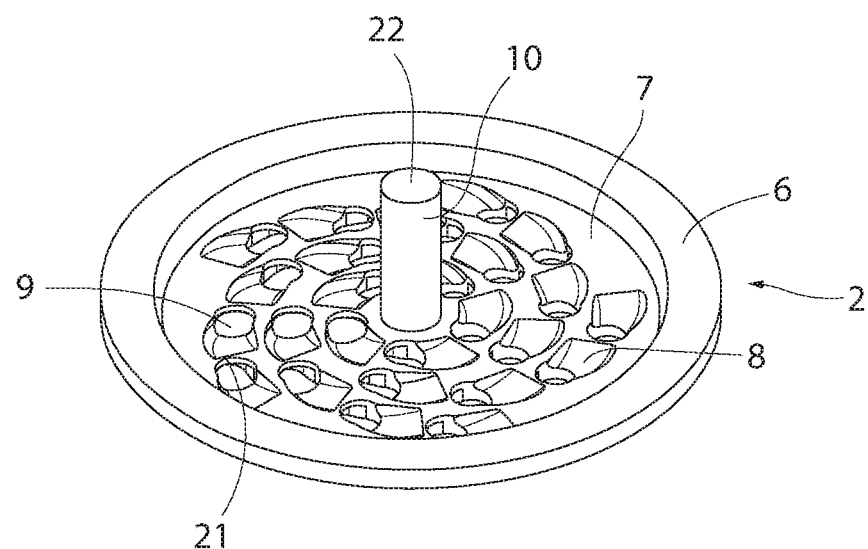
FIG. 2 depicts a top isometric view of an embodiment of the grater plate 2 of FIG. 1.

FIG. 2 shows an embodiment of the grater plate 2 of FIG. 1 in top isometric view. The grater plate rim 6 with the grater plate's recessed face 7 is below. On the recessed face 7 are seen the plurality of ramps 8, cutting edges 21, and holes 9 in radial series. The grater plate central shaft 10 with its domed interface 22 is visible originating from the center of the face.

Figure 3:
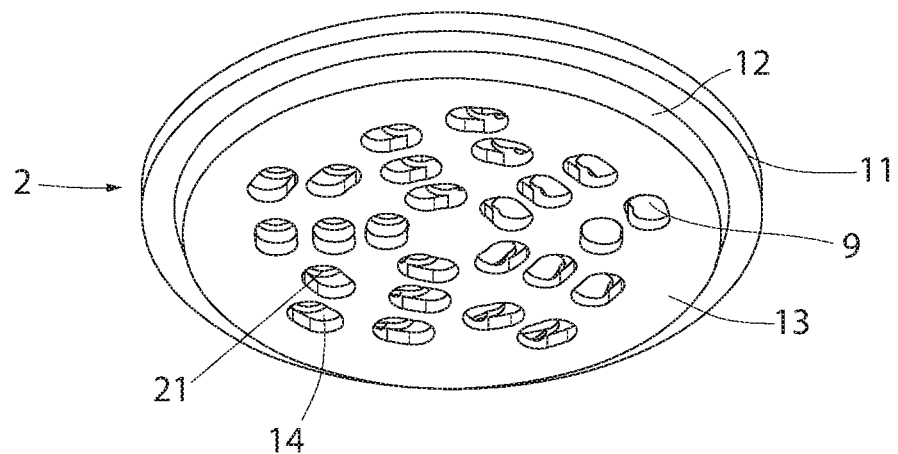
FIG. 3 depicts a bottom isometric view of an embodiment of the grater plate 2 of FIG. 1.

FIG. 3 depicts an embodiment of the grater plate of FIG. 1 in bottom isometric view. The grater plate lip 11 facilitates a detachable coupling arrangement between the grater plate 2 and the receptacle 3. The grater plate 2 is held in place by gravity within the sides of the receptacle 3, and the grater plate bottom face 13 interface with the inner diameter (ID) of the receptacle 3. The centering chamfer 12 is seen separating the grater plate lip 11 from the grater plate bottom face 13 on which can be seen the plurality of cutting edges 21, holes 9 and slots 14 in radial series.

Figure 4:
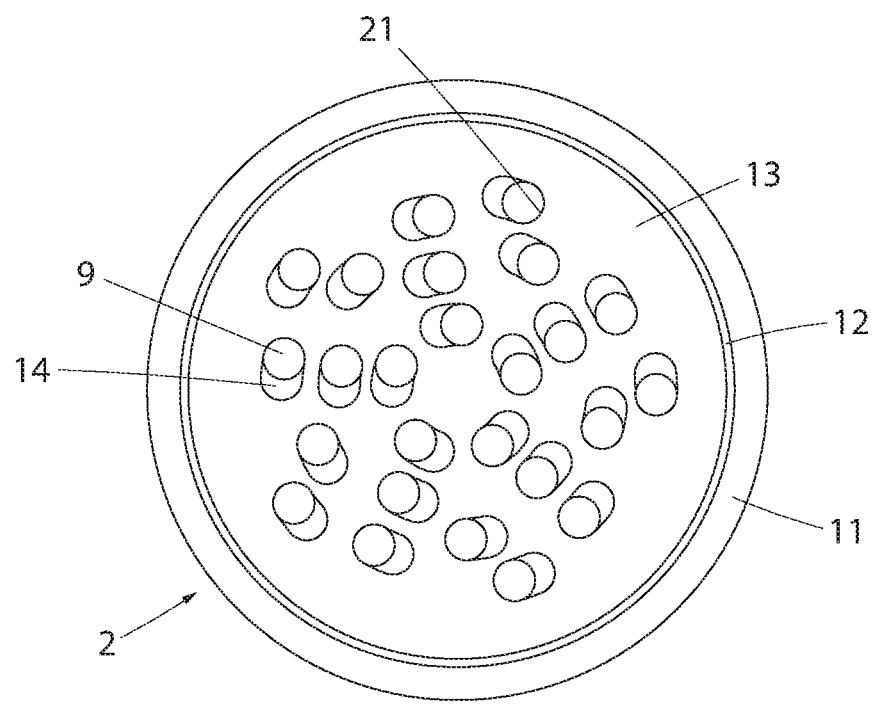
FIG. 4 depicts a bottom view of an embodiment of the grater plate 2 of FIG. 1.

FIG. 4 depicts an embodiment of the grater plate 2 of FIG. 1 in bottom view, with the slots 14, holes 9, and cutting edges 21 in a radial series. The centering chamfer 12 is seen on the perimeter of the bottom face 13 with the grater plate lip 11 on the outside.

Figure 5:
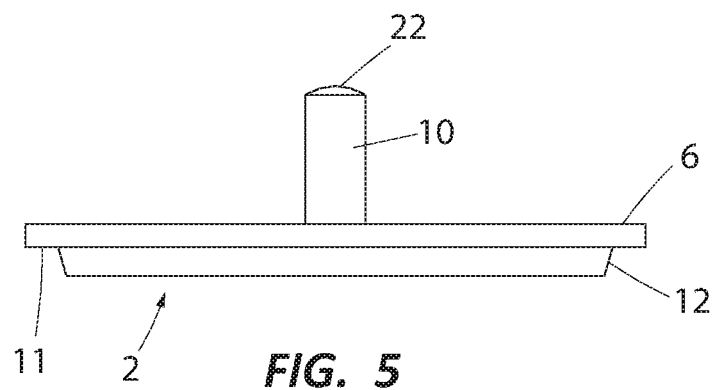
FIG. 5 depicts a side view of an embodiment of the grater plate 2 of FIG. 1.

FIG. 5 depicts an embodiment of the grater plate of FIG. 1 in side view with the centering chamfer 12 at the base. The grater plate lip 11, and rim 6 can be seen above that, with the grater plate central shaft 10 topped by its domed interface 22 emanating from the center.

Figure 6:
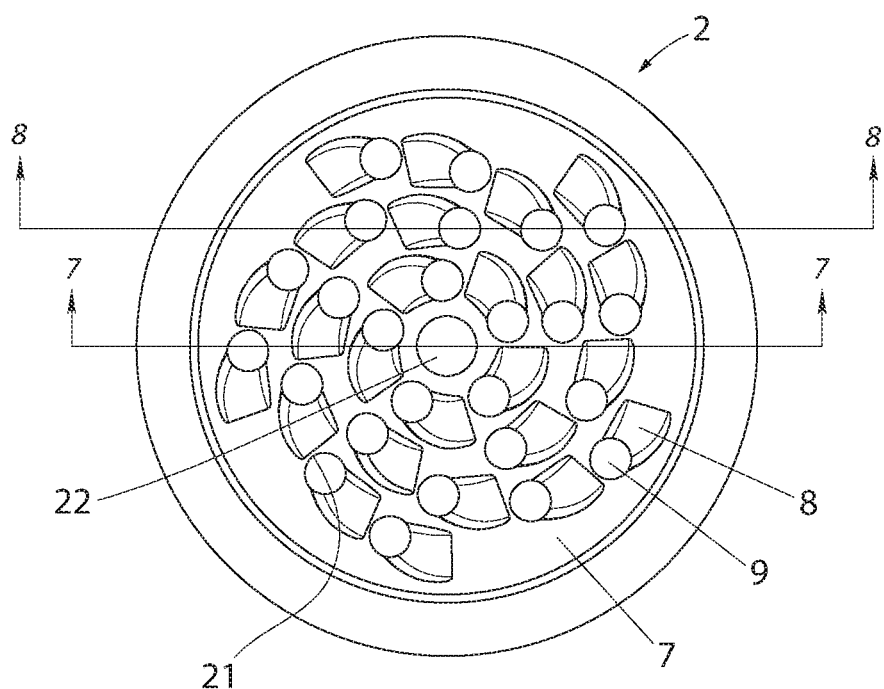
FIG. 6 depicts a top view of an embodiment of the grater plate 2 of FIG. 1.
Figure 7:
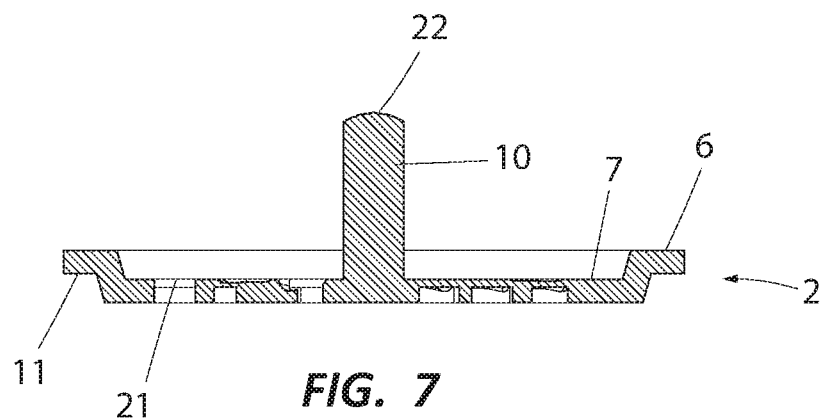
FIG. 7 depicts a cutaway view of a first cross-section of an embodiment of the grater plate 2 of FIG. 1.
Figure 8:
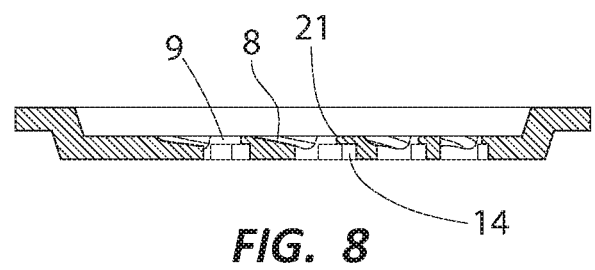
FIG. 8 depicts a cutaway view of a second cross-section of an embodiment of the grater plate 2 of FIG. 1.

FIG. 6 depicts an embodiment of the grater plate of FIG. 1 in top view, and defines the section views of FIGS. 7 and 8 respectively. The grater plate central shaft domed interface 22 is seen at the center, surrounded by the plurality of ramps 8, holes 9, and cutting edges 21 set in their radial pattern.

FIG. 7 depicts an embodiment of the grater plate 2 of FIG. 1 in bisection. The lip 11 and rim 6 can be seen on the left and right of the drawing with the grater plate central shaft 10 and domed interface 22 in the center.

FIG. 8 depicts an embodiment of the grater plate 2 of FIG. 1 in a section view wherein one can see the ramps 8, holes 9, cutting edges 21, and slots 14. The bisected view displays the placement of the slots 14 in relation to the cutting edges 21 and holes 9 at the end of the ramps 8.

Figure 9:
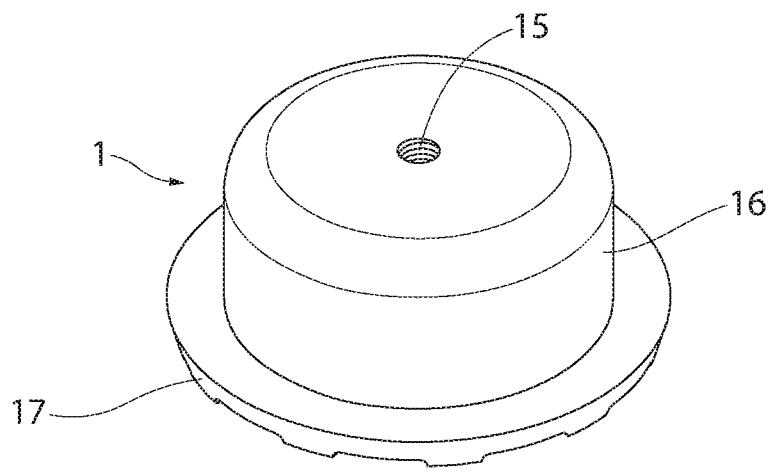
FIG. 9 depicts a top isometric view of one embodiment of the driver 1 of FIG. 1.

FIG. 9 is a top isometric view of an embodiment of the driver 1 of FIG. 1. The screw threads 15 are visible centered in the driver handle 16 with the driver plate 17 shown at the bottom of the figure.

Figure 10:
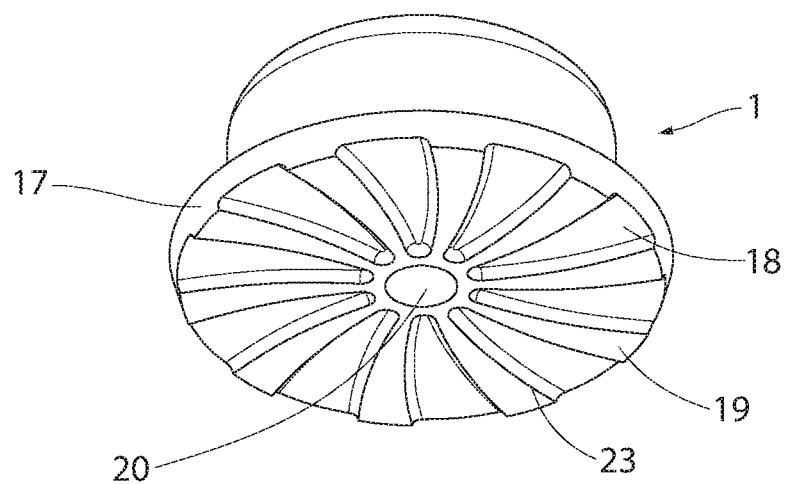
FIG. 10 depicts a bottom isometric view of one embodiment of the driver 1 of FIG. 1.

FIG. 10 is a bottom isometric view of an embodiment of the driver 1 of FIG. 1 with the driver plate 17 in main view. Depicted in detail are the driver plate tapered recesses 18, driver plate tapered flat segments 19 and their driver plate cutting edges 23 leading in a gentle arc to the driver center hole 20 which receives the grater plate central shaft 10.

Figure 11:
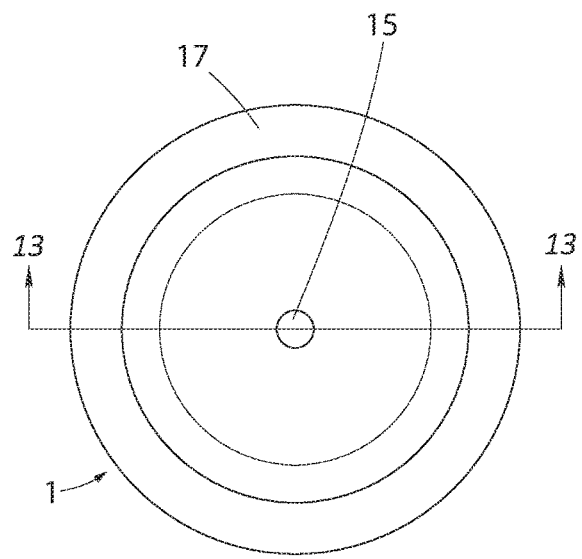
FIG. 11 depicts a top view of one embodiment of the driver 1 of FIG. 1.
Figure 13:
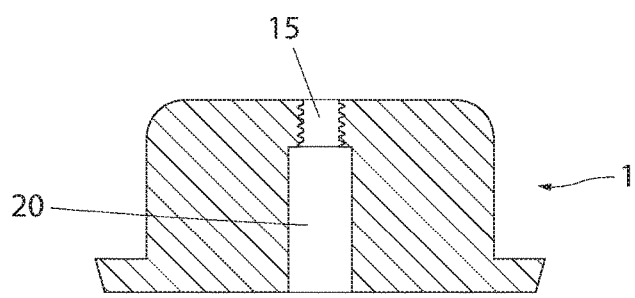
FIG. 13 depicts a cutaway side view of one embodiment of the driver 1 of FIG. 1.

FIG. 11 is a top view of an embodiment of the driver 1 and defines the section view used for FIG. 13. In the center is the screw threading 15 hole in the top of the driver 1, with the driver plate 17 seen in circumference as the perimeter of the drawing.

Figure 12:
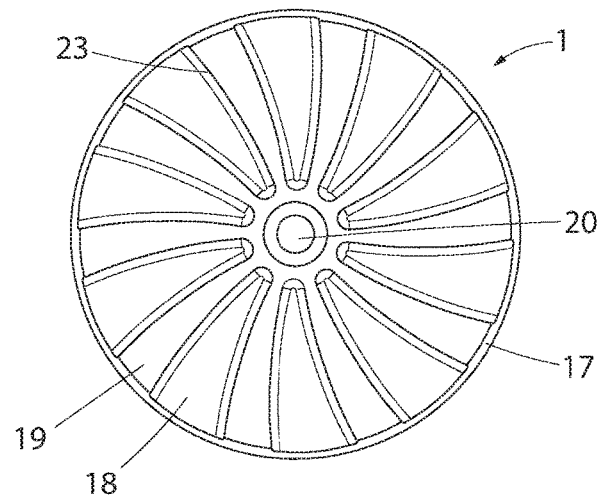
FIG. 12 depicts a bottom view of one embodiment of the driver 1 of FIG. 1.

FIG. 12 is a bottom view of an embodiment of the driver 1 of FIG. 1, where only the driver plate 17 and its tapered recesses 18, driver plate tapered flat segments 19, driver plate cutting edges 23, driver center hole 20 are seen. The curved edges of the driver plate 17 are inverse to those of the grater plate 2 when assembled.

FIG. 13 shows in bisection an embodiment of the driver 1 of FIG. 1. Here it is shown in detail how the screw threading 15 is set in the driver center hole 20.

Figure 14:
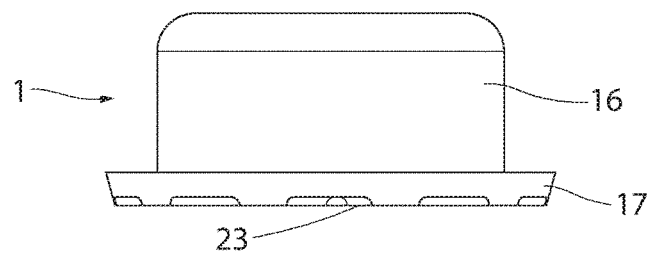
FIG. 14 depicts a side view of one embodiment of the driver 1 of FIG. 1.

FIG. 14 shows in side view an embodiment of the driver 1 of FIG. 1, the driver plate 17, and the position of one of the cutting edge 23.

Figure 15:
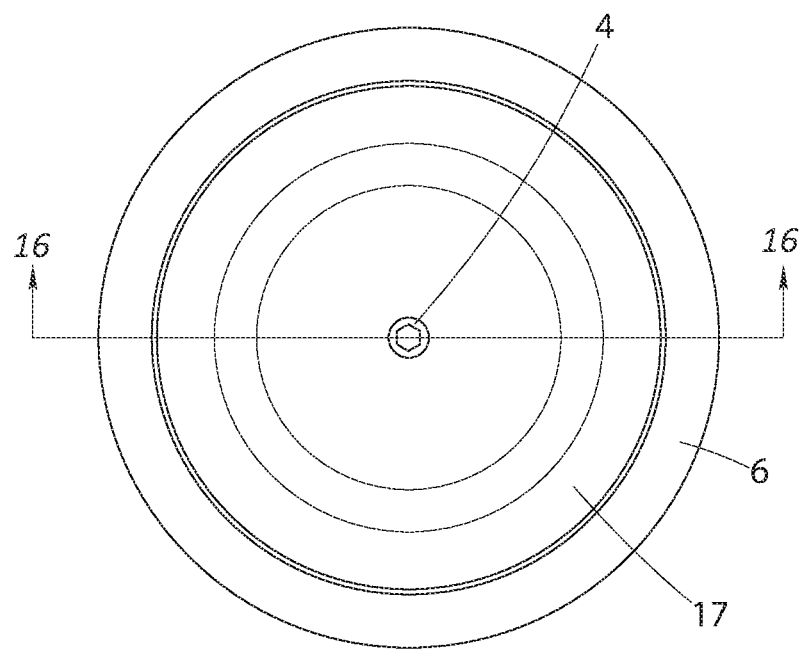
FIG. 15 depicts a top view of one embodiment of the assembly of FIG. 1.
Figure 16:
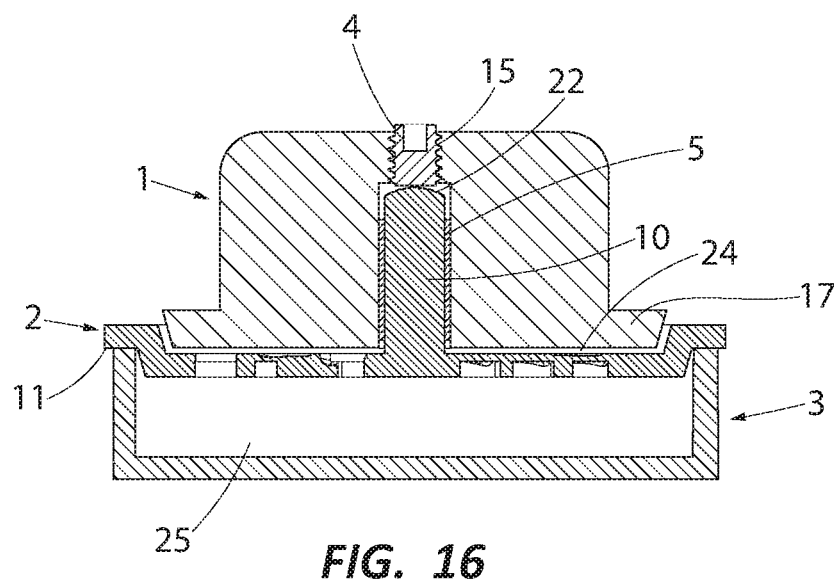
FIG. 16 depicts a cutaway side view of one embodiment of the assembly of FIG. 1.

FIG. 15 shows an embodiment of the assembly of the driver 1, grater plate 2, screw 4, and defines the section view used in FIG. 16.

FIG. 16 depicts in bisection an embodiment of the assembly and illustrates the screw 4 defining the distance between the driver plate 17 and grater plate 2 as the driver 1 rests on the grater plate central shaft 10 through the screw 4. Also seen is the interface between the grater plate central shaft 10 and the grater plate central shaft bushing 5. The volume between the driver plate 17 and grater plate 2 is designated as the mill chamber 24. The driver 1 is held in place by gravity and can be removed from the grater plate 2 by raising vertically from the central shaft 10. The collection chamber 25 is the interior volume of the receptacle 3 which has an inner diameter sized larger than that of the grater plate bottom face 13, and an outer diameter smaller than that of the grater plate perimeter lip 6.

Figure 17:
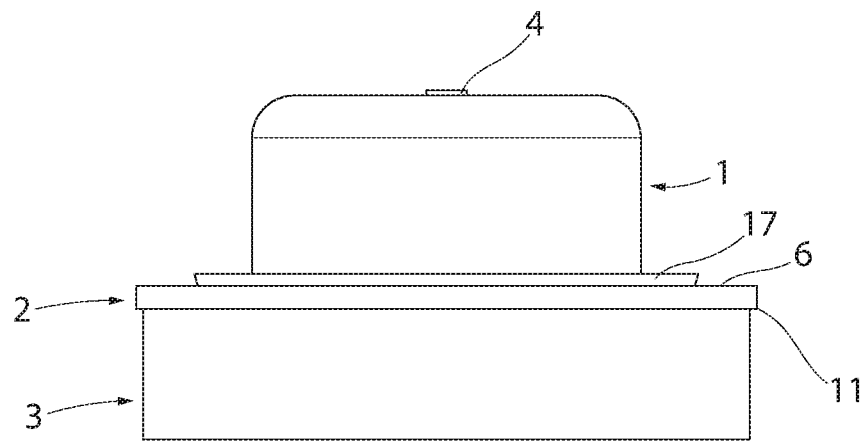
FIG. 17 depicts a side view of one embodiment of the assembly of FIG. 1.

FIG. 17 shows an embodiment of the assembly in side view in the same configuration as in FIG. 16.

Figure 18:
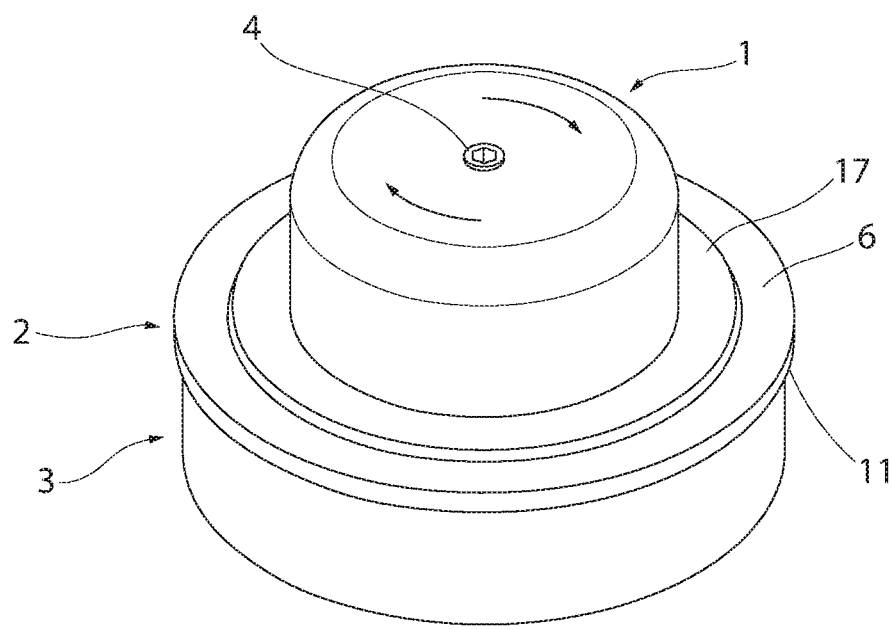
FIG. 18 depicts a top isometric view of one embodiment of the assembly of FIG. 1.

FIG. 18 is an embodiment of the assembly in isometric view, with the direction of driver 1 rotation indicated by the arrows on top. This coaxial rotation of the driver 1 with the stationary grater plate 2 creates the processing function in the mill chamber 24, displayed in detail in FIG. 19.

Figure 19:
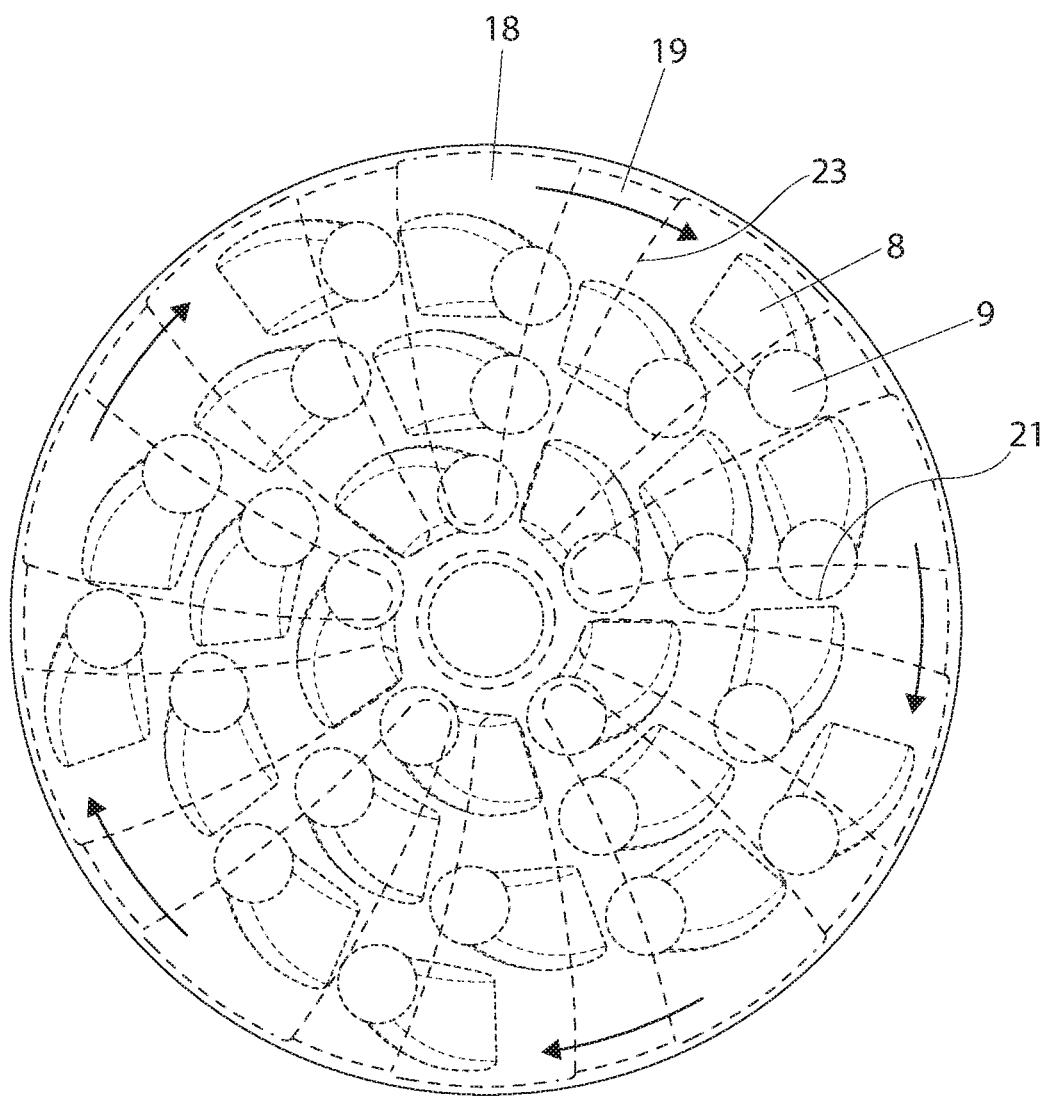
FIG. 19 depicts a transparent view of one embodiment of the combined driver and grater plate assembly of FIG. 1.

FIG. 19 is a top internal view of an embodiment of the mill chamber 24, looking at the interaction between the driver plate 17's radial series of recesses 18 with the radial series of slots 14 of the grater plate recessed face 7. The two series work together to process material as the driver plate 17 is rotated. The slight curvature of the driver plate tapered flat segments 19 facilitate material being moved from the perimeter inward. As the tapered flat segments 19 pass over the ramp 8 and eventually the cutting edge of the hole 21 the driver plate cutting edges 23 act to shear plant material. When unprocessed plant material passes between the tapered recesses 18 and a tapered flat segment 19 while compressed into the recessed grater face 7, crumbling occurs. Once processed, material falls through the holes 9 into the collection chamber 25.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

In a further embodiment, specific characteristics of the grinder are defined by the driver 1, the grater plate 2, the receptacle 3 and its collection chamber 25, and the interface between the grater plate 2 and the receptacle 3.

In one embodiment, the driver 1 includes a driver plate 17, and a handle 16 portion. The handle 16 houses a threaded screw hole 15 and screw 4, as well as facilitates the user's actuation of the driver plate to process the desired material. The driver plate 17 is may be a disk about as wide as an interior of the receptacle 3. This disk has arced, tapered recesses 18, in radial series, separated by flat segments 19 which taper as they get closer to the center. The border of these recesses 18 and flat segments 19 create a cutting edge 23. The tapered flat segments 19 converge toward the center of the driver plate 17, at a rim around a central hole 20 that accepts the grater plate central shaft 10. This central hole 20 contains the grater plate central shaft bushing 5 that reduces friction with the grater plate central shaft 10. The central hole 20 meets with the threaded screw hole 15 to create a thru-hole piercing the driver 1.

In one embodiment, the grater plate 2 has a lip 6 that separates its perimeter from a recessed face 7 sized to accept the driver plate 17. On the recessed face 7 are a plurality of ramps 8 in radial series that are both tapered and arcing as they lead to a hole 9 which is positioned in relation to the ramp 8 so as to have its diameter wider than the narrowest portion of the ramp 8. The edge of the hole 9 furthest from its attached ramp 8 acts as a cutting edge 21. At the center of the recessed face 7 is the grater plate central shaft 10 which interfaces with the driver 1 to make the two parts coaxial, as well as enabling adjustable spacing by the screw 4 so that the driver plate 17 and grater plate 2 never fully touch. Looking at the grater plate 2 from the bottom, a perimeter portion is set away from the viewer to form a lip 11 which sits on the rim of the collection chamber 3. On the interior perimeter of the lip is a chamfer 12 leading up towards the viewer and the grater plate bottom face 13. This chamfer 12 allows for the grater plate 2 to self-center in the collection chamber 25. On the grater plate bottom face 13 one sees the holes 9 as well as their accompanying slots 14 aligned in the direction of the ramps 8, which provide a pathway through the grater plate 2. The grater plate 2 and driver 1 are removable as a unit and lift from the collection chamber 25.

In another embodiment, a mill includes a mill chamber between a driver plate and grater plate. The mill also includes a collection chamber, which is capped by the grater plate sitting on the collection chamber rim. A detachable coupling arrangement allows gravity and/or the shape of the bottom of the grater plate to secure and center the grater plate as a cap to the collection chamber. The driver plate and grater plate are coaxially aligned through the interface of the driver plate with the grater plate central shaft. The grater plate central shaft also helps maintain a distance between the driver plate and the grater plate, by the contact the central shaft makes with the driver. A screw threaded through a hole in the driver plate also interfaces with the grater plate central shaft to adjust the distance between the driver plate and the grater plate. In some embodiments, rotation of the driver plate relative to the grate plate facilitates shearing, crumbling, grating, and/or general processing of material (e.g., plant material) through a plurality of ramped pockets ending in thru-holes in the grater plate. The through-holes may be set in a radial series or other patter within the grater plate. Additionally, the driver plate may operate without the presence of protrusions extending toward the grate plate beyond the cutting surfaces of the driver plate.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A milling system comprising:
   a receptacle having sidewalls to define a top opening;
   a grater plate to engage with the top opening of the receptacle, the grater plate comprising:
     a flat recessed face with a central shaft configured to extend away from the flat recessed face, wherein the central shaft is circular and centrally located on the flat recessed face;
     a central contact surface, wherein the central contact surface is disposed at a distal end of the central shaft away from the top opening of the receptacle, wherein the central contact surface comprises a domed surface; and
     a plurality of grater openings, each grater opening comprising a grater plate cutting edge, wherein each grater plate cutting edge is flush with the flat recessed face, and each grater opening comprising a ramp which is a sloped surface that begins at the flat recessed face and slopes to a plane below the each grater plate cutting edge, and
   wherein the grater plate sits partially within the receptacle and rests on a top surface of the sidewalls;
   a driver plate comprising:
     a plurality of flat segments to define a plurality of recesses and driver plate cutting edges; and
     a central engagement surface;
     an adjustor to engage between the driver plate and the grater plate, wherein the adjustor is configured to extend a variable distance between the central engagement surface of the driver plate and the central contact surface of the grater plate to establish a distance between the plurality of grater plate cutting edges and the plurality of driver plate cutting edges.

2. The milling system of claim 1, wherein the central engagement surface of the driver plate is an end of a screw, wherein the central engagement surface rests on and contacts the central contact surface.

3. The milling system of claim 2, wherein the adjustor comprises a screw to engage the screw threads of the central engagement surface on the driver plate and the central engagement surface on the central shaft of the grater plate.

4. The milling system of claim 2, wherein the driver plate comprises a center hole extending through an entire thickness of the driver plate.

5. The milling system of claim 4, wherein a portion of the center hole comprises threads.

6. The milling system of claim 5, wherein the driver plate further comprises the screw, and wherein the screw is positioned to interface with the threads.

7. The milling system of claim 6, wherein the grater plate comprises ramps, each ramp on an opposite side of the opening from the respective grater plate cutting edge.

8. The milling system of claim 7, further comprising a slot below each of the grater plate cutting edges.

9. The milling system of claim 8, wherein the central shaft of the grater plate, the center hole of the driver plate, and the sidewalls of the receptacle align concentrically.

10. The milling system of claim 9, wherein the flat segments are tapered, and wherein the recesses are tapered.

11. A milling system comprising:
    a receptacle having sidewalls to define a top opening;
    a grater plate to engage with the top opening of the receptacle, the grater plate comprising:
      a flat recessed face with a central shaft configured to extend away from the flat recessed face, wherein the central shaft is circular and centrally located on the flat recessed face;
      a central contact surface, wherein the central contact surface is disposed at a distal end of the central shaft away from the top opening of the receptacle; and
      a plurality of grater openings, each grater opening comprising a grater plate cutting edge, wherein each grater plate cutting edge is flush with the flat recessed face, and each grater opening comprising a ramp which is a sloped surface that begins at the flat recessed face and slopes to a plane below the each grater plate cutting edge, and wherein the grater plate sits partially within the receptacle and rests on a top surface of the sidewalls;
a driver plate comprising:
a plurality of flat segments to define a plurality of recesses and driver plate cutting edges; and
a central engagement surface;
an adjustor to engage between the driver plate and the grater plate, wherein the adjustor is configured to extend a variable distance between the central engagement surface of the driver plate and the central contact surface of the grater plate to establish a distance between the plurality of grater plate cutting edges and the plurality of driver plate cutting edges.

* * * * *